Dec. 30, 1969      A. K. CHITAYAT      3,486,275
THREAD GRINDING MEANS WITH AUTOMATIC CONTROL
Filed Dec. 19, 1966                 2 Sheets-Sheet 2
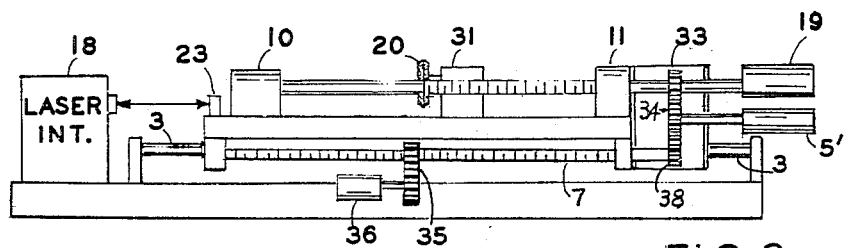
FIG 3
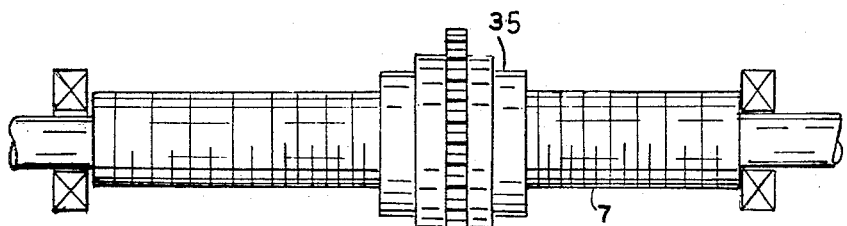
FIG 4
FIG 5
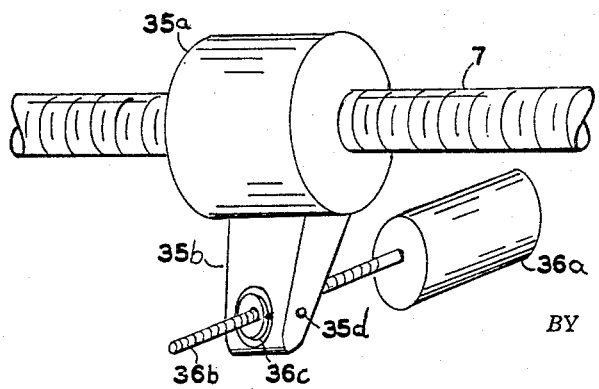
INVENTOR.
ANWAR K. CHITAYAT
BY James P Malone

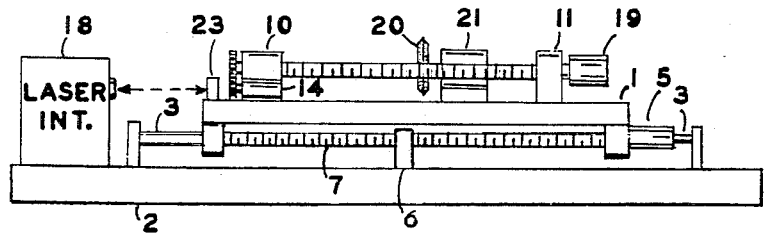
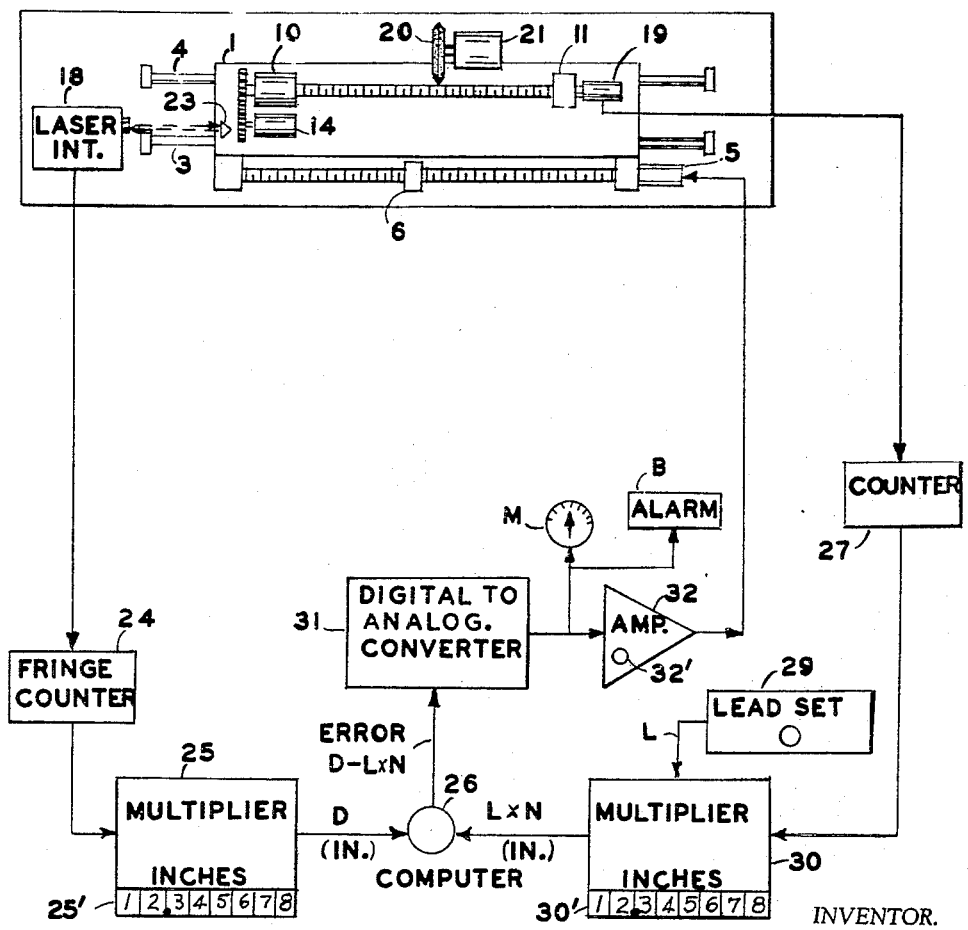

United States Patent Office 3,486,275
Patented Dec. 30, 1969

3,486,275
THREAD GRINDING MEANS WITH
AUTOMATIC CONTROL
Anwar K. Chitayat, Plainview, N.Y., assignor to
Optomechanisms, Inc., Plainview, N.Y.
Filed Dec. 19, 1966, Ser. No. 602,644
Int. Cl. B24b 49/00, 51/00
U.S. Cl. 51—165                               8 Claims

ABSTRACT OF THE DISCLOSURE

A laser interferometer is used to measure exact distances of the grinding wheel relative to the moving carriage of the thread grinder. A highly accurate digitizer is also supplied to measure the angular orientation of the lead screw, which is achieved while the grinder is in process. A computer is provided to compare the angle of the lead screw versus the linear displacement of the lead screw resulting in a computed error. This error is amplified in a servo amplifier and made to drive a lead control mechanism to change the lead being set into the thread grinder so that its accuracy is enhanced.

---

This invention relates to thread grinding means for precision lead screws and more particularly to such means having automatic control.

Precision lead screws are used in machine tools, measuring apparatus and in other precision apparatus. In manufacturing this type of apparatus it is desired to make measurements in millionths of an inch. A practical way to make such measurements is with an optical method, for instance with an interferometer. Applicant has found that a laser interferometer gives the best results.

The present invention provides thread grinding apparatus which includes a laser interferometer and includes means for automatically controlling the lead of the grinding wheel with respect to the screw being made.

The heart of this system is an interferometer, for instance Optomechanisms, Inc. Model 437L–512 Dual Beam Laser Interferometer, or as in Patent No. 3,271,676, Sept. 6, 1966 which has been shown to realize accuracies in the order of microinches over long distances exceeding 100 inches. Then in-process system uses the laser interferometer to measure exact distances of the grinding wheel relative to the moving carriage of the thread grinder. This distance is read out in microinches on an eight digit inch display. In addition to the above, a highly accurate digitizer is also supplied to measure the angular orientation of the lead screw, which is achieved while the grinder is in process. A computer is provided to compare the angle of the lead screw versus the linear displacement of the lead screw resulting in a computer error. This error is amplified in a servo amplifier and made to drive a lead control mechanism to change the lead being set into the thread grinder so that its accuracy is enhanced.

The concept of automatically measuring the errors of the lead screw as it is being manufactured realizes a high degree of accuracy which is in the order of 1 part/million, or 20 microinches, whichever is greater. In addition to realizing high accuracy, it is believed that the computer corrected system will result in speeding up production, and saving manufacturing time. Excessive errors can automatically be observed and any failures within the machine will be noted immediately, and corrected before further damage is introduced.

The invention generally comprises a carriage movable along an axis, motor means connected to move said carriage, means to rotatably mount a lead screw on said carriage, means to rotate said lead screw, a fixedly mounted grinding wheel adapted to cut a thread in said lead screw, means connected to said lead screw and adapted to transmit angular measurement of said lead screw rotation, an interferometer fixedly mounted adjacent to said carriage, a reflector mounted on said carriage and adapted to reflect back energy received from said laser to thereby measure the motion of said carriage along said axis, said interferometer means having a digital output, means to compare said interferometer output and said digitizer output, means to modify the output of said digitizer according to the lead of said screw and servo means responsive to the error output of said comparing means to control said motor to carriage travel so as to reduce said error to zero.

Accordingly a principal object of the invention is to provide new and improved thread grinding means.

Another object of the invention is to provide new and improved thread grinding means with automatic control of the lead of the screw.

Another object of the invention is to provide new and improved thread grinding means with optical measuring and control means.

Another object of the invention is to provide new and improved thread grinding means with laser interferometer measuring and control.

Another object of this invention is to provide new and improved thread grinding means for lead screws with automatic control comprising; a carriage movable along an axis, motor means connected to move said carriage, means to rotatably mount a lead screw on said carriage, means to rotate said lead screw, a fixedly mounted grinding wheel adapted to cut a thread in said lead, means connected to said lead screw and adapted to transmit angular measurement of said lead screw rotation, an interferometer fixedly mounted adjacent to said carriage, a reflector mounted on said carriage and adapted to reflect back energy received from said laser to thereby measure the motion of said carriage along said axis, said interferometer means having a digital output, means to compare said interferometer output and said digitizer output, means to modify the output of said digitizer according to the lead of said screw and servo means responsive to the error output of said comparing means to control said motor and carriage travel so as to reduce said error to zero.

These and other objects of the invention will be apparent from the following specifications and drawings of which:

FIGURE 1 is a schematic diagram of an embodiment of the invention.

FIGURE 2 is an elevation view of the moving carriage apparatus of FIGURE 1.

FIGURE 3 is an elevation view of a modification of the invention.

FIGURES 4 and 5 are detail views of the correction nut means.

Referring to the figures the invention generally comprises a movable carriage 1 which is movably mounted on a platform 2 for movement along an axis. The platform is preferably mounted on ways 3 and 4 by means of precision bearings, for instances as disclosed in Patent 3,076,682 granted Feb. 5, 1963. The carriage is adapted to be moved along the by means of a motor 5, which is mounted on the carriage. The motor 5 drives lead screw 7 which is rotatably mounted on the carriage and axially constrained and which engages a nut 6 fixedly mounted on the base platform 2, so that the lead screw 7 and nut 6 drive the carriage.

On top of the carriage is mounted a headstock 10 and a tailstock 11 which are adapted to rotatably mount the work piece lead screw 12. A motor drive is connected to the headstock to rotate the lead screw comprising a motor 14 which is connected to the headstock by means of gears or other conventional means.

The thread on the lead screw 12 is adapted to be cut by the grinding wheel 20 which is driven by the fixedly mounted motor 21 mounted on platform 2.

A digital encoder or digitizer 19 is mounted on the tailstock 11 and connected to the lead screw so that as the lead screw rotates the digitizer transmits pulses proportionally to the amount of rotation.

The travel of the carriage along the axis is measured by means of the laser 18 which sends a beam of energy to the reflector 23 which is fixedly mounted on the carriage 1. The reflector 23 returns the beam back to the laser interferometer in conventional manner.

The laser interferometer includes a fringe counter 24 the output of which is connected to a multiplier computer 25 where the count is multiplied by a constant multiplier to convert the count to inches. The computer 25 preferably has a display 25' indicating the travel in micro inches. The output of the computer 25 is the inch measurement D in digital form and this is connected to a comparator 26.

The output of the angular digitizer 19 is connected to a counter 27 the output of which is a count in digital form which is proportional to the lead screw rotation. The counter 27 is connected to a multiplier computer 30 which may be similar to a computer 25. The multiplier factor L, which the lead of the screw, is inserted in the computer 30 by input means which may be a seven decade switch 29 for setting in a seven digit multiplier. The computer 30 preferably has a display 30' of the computed travel in micro inches.

The output of the computer 30 is $L \times N$ and is fed to the comparator 26 which may be a conventional digital comparator which subtracts the two inputs to obtain the error $E = D - L \times N$ in inches. This error is fed to a digital to analogue converter 31 which may be conventional.

The output of the converter 31 is a plus or minus D.C. voltage proportional to the error. This is fed to the servo amplifier 32, the output of which is connected to the motor 5. The error is also read on meter M to show the operator the amount of the error. The error is also preferably connected to an alarm B which is set to be energized when the error exceeds a predetermined amount.

More specifically, FIGURE 2 illustrates the block diagam of the systems. The laser interferometer and associated computer measures the exact travel of the moving carriage carrying the lead screw. The lead screw is being ground, while the carriage is moving linearly and while it is rotated about its axis. The lead of the screw (L), expressed in inches per revolution is related to the distance ($d$) travelled by the well known formula—

$$d = L \times N$$

where N is the number of revolutions traversed.

If an error exists within the thread grinder, it can be measured by comparing the length traversed (D) and lead (L) times the number of revolutions N or $$\text{Error} = D - L \times N$$

Digitizer 19 is provided which is directly attached to the rotating member for the screw. This measures and transmits in digitial form the angular orientation of the screw, which is then multiplied in a computer 30 by a manually set factor L corresponding to the desired lead of the screw.

The resultant multiplication $L \times D$ is the computed distance that should have been traversed, if the lead is perfect. The error is then the difference between the two inputs $D - L \times N$, which is developed in a digital comparator. This is converted into a DC electrical error signal through a digital-to-analog converter 31. This error is then applied to a servo amplifier 32 to actuate a servo motor 5 which changes the lead slightly to correspond with the error signals. In this manner, the servo closes the loop to result in errors not to exceed a predetermined value.

It must be realized that the servo system will not compensate for high frequency errors caused by chatter or vibration. The servo system is designed to be slow in nature, in order to prevent over-correction.

FIGURE 3 shows the modification of the invention wherein the drive motor 5' is connected to the lead screw 7 through a set of change gears 33, 34, 38 so that the pitch of the thread may be changed by changing the ratio of the gears. In this embodiment the nut 35 is rotatably mounted but secured against axial movement. The rotation adjustment of nut 35 is made by the servo motor 36 which is shown in FIGURES 3 and 4.

FIGURE 4 shows one arrangement for mounting the nut 35. In this arrangement the servo motor 36 is fixedly mounted on the platform and is geared to the nut 35 by means of the gears 36' and 35' which mesh. The correction by the servo motor comprises a small amount of rotation and the nut 35 is axially secured and controlled by the servo motor 36.

FIGURE 5 shows another arrangement hereby the nut member 35a is mounted on the shaft 7 and is adapted to be controlled by the servo motor 36a. In this arrangement the nut 35a has an extension member 35b which has a tapped gimbal 36c mounted on pin 35d and the shaft 36b of the motor 36 is threaded and engaged in the tapped gimbal so that rotation of the servo motor 36a rotates its shaft and caused the nut member 35a to rotate slightly for the purpose of making the necessary correction. The shaft 36b restrains the nut member 35a from other axial movement.

LASER INTERFEROMETER

The laser interferometer utilized in the In-Process system may be a standard OPTO mechanisms' Model 437L–512. This system is portable and can also be used to check other machine tools. It preferably contains a stabilized laser with servo control and oven temperature stabilization. It is provided with a highly accurate correction computer to compensate for temperature, pressure and humidity of the air. In addition, it compensated for temperature of the part by measuring its temperature prior to starting a run as disclosed in copending application entitled Environmental Corrections Computer filed Nov. 14, 1966, Ser. No. 594,213. A typical laser system is disclosed in my copending application entitled "Lead Screw Checking Means" filed Sept. 9, 1966, S.N. 578,201.

DIGITIZER

The angular encoder 19 utilized in this system, is preferably a commercially available highly accurate optical incremental encoder utilizing a long life light source and 2 photo sensors. A graduated disc contains 10,000 optical lines, per revolution. Two output signals are developed to realize direction sensing. The size of the unit is approximately 5 inches long x 4 inch diameter, and is attached directly to the working spindle of the thread grinder.

DIGITIZER READOUT SYSTEM

The output of the digitizer is used as the imput to a high speed reversible counter 27. Each optical element of the digitizer results in four (4) electrical pulses that are counted by the counter. Consequently, the resolution of the digitizer is one part in 40,000 of a revolution. The accuracy of the digitizer is ±one count, resulting in a digitizer accuracy of ±½ minutes of arc. However, due to possible interconnection misalignment of the digitizer to the lead screw, the total readout accuracy may be ±1 minute of arc.

COMPUTED INCH DISPLAY FROM DIGITIZER

The output N of the difiitizer counter 27 is applied to a multiplier computer 30 to be multiplied by a manually set lead L to result in a "computed inch display" having eight digits and/or sign. Each least significant number represents one microinch. The multiplier constant input is a given decade thumb switch 30' which can be set to 9,999,999.

This computer is identical to computer 25 used by the interferometer, in order to realize interchangeability and reliability.

COMPARATOR AND DIGITAL-TO-ANALOGUE CONVERTER

The error D−LM is realized by digital computer by comparing the two outputs described above. In order to achieve a high order accuracy, the subtraction is first achieved digitally and then converted to an analogue DC signal.

ERROR READOUT METER

This meter M is an integrating type to provide the operator with an indication of the error. The sensitivity of the meter can be selected to read 100 microinches full scale, or 1,000 microinches full scale.

ALARM BUZZER

An alarm buzzer B is suplied so that when the error exceeds a predetermined value, the alarm is sounded. This error is set by the operator on a calibrated dial.

SERVO AMPLIFIER AND MOTOR

The servo amplifier 32 accepts the error signal from the digital-to-analogue converter 31 and amplifies it to apply it to drive a servo motor 5 to correct the lead of the screw. The motor is used as an integrating device to change the lead; consequently, it is preferably geared down to prevent over correction. The gain of the servo loop is preferably adjustable by gain control 32' in order to allow the operator to optimize the performance of the system. It is recommended that in normal operation of the machine, a dry initial run is made, to determine the optimum setting of the gain. A DC meter M is provided to observe the errors. Consequently, the optimum setting is realized when the error does not exceed a predetermined value.

Many modifications may be made by those who desire to practice the invention without departing from the scope thereof which is defined by the following claims:

1. Thread grinding means for lead screws with automatic control comprising:
   a carriage movable along an axis,
   motor means connected to move said carriage,
   means to rotatably mount a lead screw on said carriage,
   means to rotate said lead screw,
   a fixedly mounted grinding wheel adapted to cut a thread in said lead screw,
   transmitter means connected to said lead screw and adapted to transmit angular measurement of said lead screw rotation,
   an interferometer fixedly mounted adjacent to said carriage,
   a reflector mounted on said carriage and adapted to reflect back energy received from said interferometer to thereby measure the motion of said carriage along said axis, means to modify the output of said transmitter means according to the lead of said screw,
   means to compare said interferometer output and said modified angular measurement output,
   servo means responsive to the error output of said comparing means to control said motor and carriage travel so as to reduce said error to zero.

2. Apparatus as in claim 1 having error indicating means.

3. Apparatus as in claim 1 wherein said transmitter means is a digital transmitter.

4. Apparatus as in claim 1 wherein said interferometer is a laser interferometer.

5. Machine tool means with automatic control comprising:
   a carriage movable along an axis,
   motor means connected to move said carriage,
   means to movably mount a work piece on said carriage,
   means to move said work piece,
   a fixedly mounted work means adapted to act on said work piece,
   transmitter means connected to said work piece and adapted to transmit measurement of said work piece movement,
   an interferometer fixedly mounted adjacent to said carriage
   a reflector mounted on said carriage and adapted to reflect back energy received from said interferometer to thereby measure the motion of said carriage along said axis,
   means to compare said interferometer output and the output of said transmitter means,
   servo means responsive to the error output of said comparing means to control said motor and carriage travel so as to reduce said error to zero.

6. Apparatus as in claim 5 wherein said motor means to move said carriage comprises:
   a lead screw rotatably mounted on said carriage,
   a nut on said lead screw and a servo motor connected to rotatably adjust said nut.

7. Apparatus as in claim 5 wherein said means to rotate said work piece includes a set of change gears.

8. Apparatus as in claim 1 wherein said interferometer is of the type having environmental correction means.

References Cited

UNITED STATES PATENTS

| 1,275,218 | 8/1918 | Calkins | 51—92 |
| 2,806,293 | 9/1957 | James et al. | 88—14 |
| 2,829,442 | 4/1958 | Peickii | 51—288 X |
| 2,829,471 | 4/1958 | Peickii | 51—165 X |
| 3,264,788 | 8/1966 | Coes et al. | 51—165 |
| 3,382,761 | 5/1968 | Dyson | 88—14 |

LESTER M. SWINGLE, Primary Examiner